(12) United States Patent
Kondo

(10) Patent No.: US 11,034,029 B2
(45) Date of Patent: Jun. 15, 2021

(54) JOINT STRUCTURE FOR ROBOT

(71) Applicant: TOYOTA JIDOSHA KABUSHIKI KAISHA, Toyota (JP)

(72) Inventor: Hiroyuki Kondo, Shinagawa-ku (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 271 days.

(21) Appl. No.: 16/162,509

(22) Filed: Oct. 17, 2018

(65) Prior Publication Data
US 2019/0152068 A1 May 23, 2019

(30) Foreign Application Priority Data

Nov. 20, 2017 (JP) .............................. JP2017-222517

(51) Int. Cl.
*B25J 15/02* (2006.01)
*B25J 15/08* (2006.01)
*B25J 15/00* (2006.01)
*B25J 9/10* (2006.01)

(52) U.S. Cl.
CPC ............ *B25J 15/022* (2013.01); *B25J 9/1065* (2013.01); *B25J 15/0009* (2013.01); *B25J 15/0213* (2013.01); *B25J 15/086* (2013.01)

(58) Field of Classification Search
CPC .. B25J 15/0009; B25J 15/022; B25J 15/0213; B25J 15/024; B25J 15/08; B25J 15/086; B25J 15/10; B25J 9/1065
USPC ........................................................ 294/106
See application file for complete search history.

(56) References Cited

U.S. PATENT DOCUMENTS

| | | | | |
|---|---|---|---|---|
| 5,108,140 A | * | 4/1992 | Bartholet | ............. B25J 15/0009 294/106 |
| 5,762,390 A | * | 6/1998 | Gosselin | ................ B25J 15/103 294/106 |
| 8,720,964 B2 | * | 5/2014 | Birglen | .................... B25J 15/08 294/106 |
| 8,757,690 B2 | * | 6/2014 | Gao | ......................... B25J 15/08 294/198 |
| 9,089,976 B2 | * | 7/2015 | Dan | ....................... B25J 15/022 |
| 9,814,604 B2 | | 11/2017 | Jury | |

(Continued)

FOREIGN PATENT DOCUMENTS

| | | |
|---|---|---|
| CN | 203752160 U | 8/2014 |
| JP | 2002-103269 A | 4/2002 |
| JP | 2013123786 A | 6/2013 |

(Continued)

*Primary Examiner* — Dean J Kramer
(74) *Attorney, Agent, or Firm* — Sughrue Mion, PLLC

(57) ABSTRACT

A joint structure for a robot including a four-link mechanism, in which an elastic member expands and its restoring force increases as a finger is bent, and a distance between a second straight line passing through a center of a second rotation shaft and a fixed point at which the other end of the elastic member is fixed to the third link is equal to or longer than a distance between a fourth straight line passing through a center of a first rotation shaft and a fixed point at which one end of the elastic member is fixed to the second link, the second straight line being perpendicular to a first straight line passing through centers of second and fourth rotation shafts, and the fourth straight line being perpendicular to a third straight line passing through centers of first and third rotation shafts.

2 Claims, 15 Drawing Sheets

(56) References Cited

U.S. PATENT DOCUMENTS

2015/0230941 A1   8/2015   Jury

FOREIGN PATENT DOCUMENTS

| JP | 2016-068192 A | 5/2016 |
| JP | 2016-150429 A | 8/2016 |
| WO | 2013069118 A1 | 5/2013 |

\* cited by examiner

JOINT STRUCTURE FOR ROBOT

CROSS REFERENCE TO RELATED APPLICATIONS

This application is based upon and claims the benefit of priority from Japanese patent application No. 2017-222517, filed on Nov. 20, 2017, the disclosure of which is incorporated herein in its entirety by reference.

BACKGROUND

The present disclosure relates to a joint structure for a robot, and in particular to a finger structure for a robot hand.

Robot hands that mimic human hands to enable robots to perform complex tasks have been developed. Some of such robot hands are adapted so that their fingers fit an external shape of a component to be grasped, which is a target object, when they grasp the component to be grasped.

For example, a finger structure for a robot hand disclosed in Japanese Unexamined Patent Application Publication No. 2002-103269 (hereinafter referred to as Patent Literature 1) includes a first finger plate, a second finger plate, and a third finger plate. The first and second finger plates are rotatably connected to each other through a torsion spring that exerts a restoring force in an extending direction as the finger is bent. Further, the second and third finger plates are also rotatably connected to each other through a torsion spring that exerts a restoring force in an extending direction as the finger is bent.

In the above-described finger structure, for example, when the first finger plate comes into contact with the component to be grasped (hereinafter also referred to as the grasped component) in a state where the finger is extended, the second and third finger plates move so as to grasp the grasped component and thereby the finger fits the grasped component.

SUMMARY

The present inventors have found the following problem. In the finger structure disclosed in Patent Literature 1, the first and second finger plates are connected to each other, and the second and third finger plates are connected to each other by the torsion springs that exert restoring forces in the extending directions as the finger is bent. Therefore, in order to grasp a grasped component by using the finger structure for a robot hand disclosed in Patent Literature 1, a driving force that overcomes the restoring force of the torsion spring is required, thus causing a problem that the size of an actuators such as a servo motor for moving the finger increases.

The present disclosure has been made in view of the above-described problem and an object thereof is to provide a joint structure for a robot capable of contributing to reducing a size of an actuator for moving a joint in the robot.

A first exemplary aspect is a joint structure for a robot, including a four-link mechanism, in which
the four-link mechanism includes:
a first link configured to be rotatable around a first rotation shaft by an actuator;
a second link configured to be rotatable around the first rotation shaft with respect to the first link;
a third link configured to be rotatable around a second rotation shaft with respect to the first link; and
a fourth link configured to be rotatable around a third rotation shaft with respect to the second link, and rotatable around a fourth rotation shaft with respect to the third link,
the first, second, third and fourth rotation shafts differ from each other,
the joint structure further includes a first elastic member, one end of the first elastic member being fixed to the second link and the other end thereof being fixed to the third link,
when an extended state of a finger is defined as an initial state, the first elastic member expands and its restoring force increases as the finger is bent, and
in the initial state of the finger, on a plane perpendicular to a direction in which the first rotation shaft extends, a distance between a second straight line passing through a center of the second rotation shaft and a fixed point at which the other end of the first elastic member is fixed to the third link is equal to or longer than a distance between a fourth straight line passing through a center of the first rotation shaft and a fixed point at which the one end of the first elastic member is fixed to the second link, the second straight line being perpendicular to a first straight line passing through centers of the second and fourth rotation shafts, and the fourth straight line being perpendicular to a third straight line passing through centers of the first and third rotation shafts.

By the above-described configuration, when the robot hand grasps a grasped component, a moment is applied in a direction in which the grasped component is grasped by the first elastic member. Therefore, when the robot hand grasps the grasped component, the restoring force of the first elastic member is added to a driving force applied by the actuator, so that the robot hand can grasp the grasped component with a small driving force. As a result, it is possible to contribute to reducing the size of the actuator for moving the joint in the robot.

In the above-described joint structure for a robot, the first elastic member is preferably a ring member made of resin.

In this way, compared to the case where a coil spring or the like is used as the first elastic member, the space for mounting the first elastic member may be narrowed and the cost is reduced.

The above-described joint structure for a robot preferably further includes:
a fifth link configured to be rotatable around a fifth rotation shaft with respect to the third link; and
a sixth link configured to be rotatable around a sixth rotational shaft with respect to the fourth link, and rotatable around a seventh rotational shaft with respect to the fifth link.

In this way, it is possible to realize a fine fitting motion for the grasped component.

The above-described joint structure for a robot preferably further includes a second elastic member, one end of the second elastic member being fixed to the fourth link and the other end thereof being fixed to the fifth link.

The second elastic member preferably expands and its restoring force increases as the finger is bent.

In the initial state of the finger, on a plane perpendicular to a direction in which the third rotation shaft extends, a distance between a sixth straight line passing through a center of the third rotation shaft and a fixed point at which the other end of the second elastic member is fixed to the fifth link is preferably equal to or longer than a distance between the sixth straight line and a fixed point at which the one end of the second elastic member is fixed to the fourth link, the sixth straight line being perpendicular to a fifth straight line passing through centers of the third and sixth rotation shafts.

In this way, when the fourth and sixth links are rotated, the restoring force of the second elastic member can be added to the driving force applied by the actuator.

In the above-described joint structure for a robot, the second elastic member is preferably a ring member made of resin.

In this way, compared to the case where a coil spring or the like is used as the second elastic member, the space for mounting the second elastic member may be narrowed and the cost is reduced.

According to the present disclosure, it is possible to contribute to reducing a size of an actuator for moving a joint in a robot.

The above and other objects, features and advantages of the present disclosure will become more fully understood from the detailed description given hereinbelow and the accompanying drawings which are given by way of illustration only, and thus are not to be considered as limiting the present disclosure.

DESCRIPTION OF EMBODIMENTS

Specific embodiments to which the present disclosure is applied are described hereinafter in detail with reference to the drawings. However, the present disclosure is not limited to the below-shown embodiments. Further, the following description and drawings are simplified as appropriate for clarifying the explanation.

First Embodiment

Figure 1:
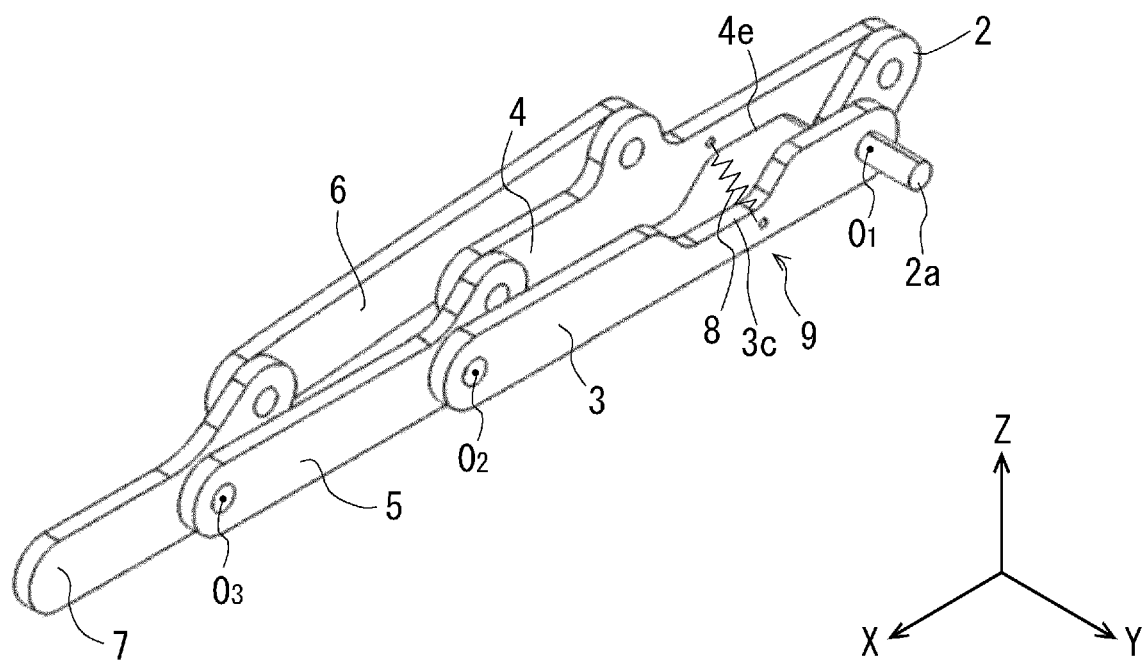
FIG. 1 is a perspective view schematically showing an initial state of a finger to which a joint structure for a robot according to a first embodiment is adopted.
Figure 2:
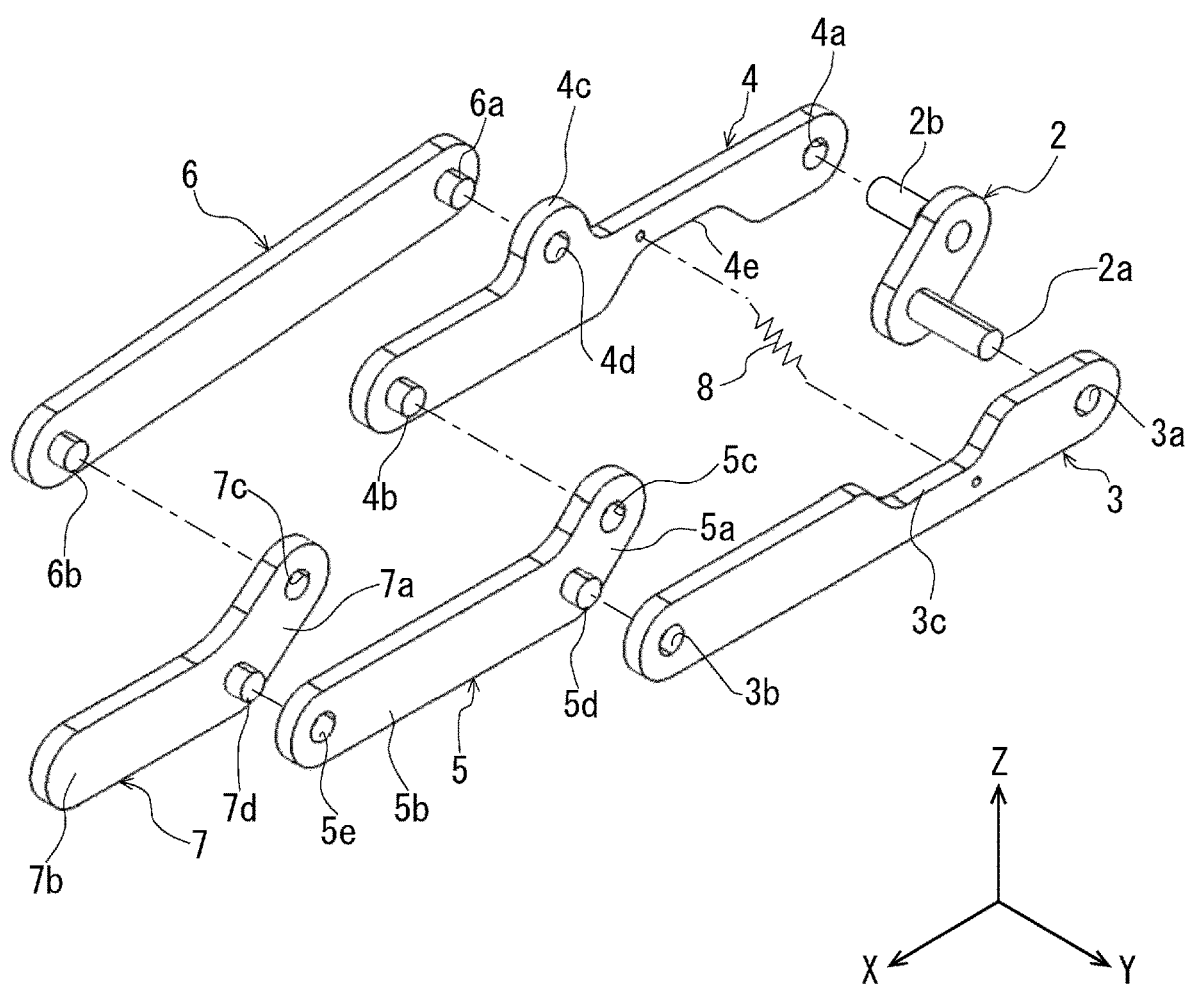
FIG. 2 is an exploded view of the finger to which the joint structure for the robot according to the first embodiment is adopted.

Firstly, a configuration of a finger to which a joint structure for a robot according to this embodiment is adopted is described. FIG. 1 is a perspective view schematically showing an initial state of the finger to which the joint structure for the robot according to this embodiment is adopted. FIG. 2 is an exploded view of the finger to which the joint structure for the robot according to this embodiment is adopted.

The joint structure for a robot according to this embodiment can be suitably adopted to, for example, fingers of a robot hand that mimics a human hand. As shown in FIGS. 1 and 2, a finger 1 to which a joint structure for a robot according to this embodiment is adopted includes a first link 2, a second link 3, a third link 4, a fourth link 5, a fifth link 6, a sixth link 7, and an elastic member 8 such as a coil spring, and is rotatably connected to a palm part (not shown).

In the following description, a configuration of the finger 1 in an initial state in which the finger 1 is extended is described by using a three-dimensional (XYZ) coordinate system for clarifying the explanation. Note that the negative side on the X-axis (hereinafter simply referred to as the "X-axis negative side") corresponds to the base side of the finger 1, and the X-axis positive side corresponds to the tip side of the finger 1. Further, the Z-axis negative side corresponds to the palm side of the hand, and the Z-axis positive side corresponds to the back side of the hand.

The first link 2 is a driving link that is rotationally driven by an actuator such as a servo motor (not shown) provided in the palm part. For example, as a basic form, the first link 2 is composed of a roughly rectangular plate member having a small thickness in the Y-axis direction and in which a ratio of a long-side length to a short-side length on the XZ-plane is large. Further, the first link 2 is inclined with respect to the X-axis toward the Z-axis positive side by about 30°. The first link 2 includes a first rotation shaft 2a that protrudes from one end of the first link 2 toward the Y-axis positive side. The first rotation shaft 2a is connected to a rotation shaft of the actuator so that a rotational torque can be transmitted from the actuator to the first rotation shaft 2a.

The first link 2 also includes a second rotation shaft 2b that protrudes from the other end of the first link 2 toward the Y-axis negative side. The first link 2 having the above-described structure rotates around the first rotation shaft 2a as the rotational torque of the actuator is transmitted to the first rotation shaft 2a.

The second link 3 is connected so that it can rotate around the first rotation shaft 2a provided in the first link 2 with respect to the first link 2. For example, as a basic form, the second link 3 is composed of a roughly rectangular plate member having a small thickness in the Y-axis direction and in which a ratio of a long-side length to a short-side length on the XZ-plane is large. Further, the direction of the long side of the second link 3 is roughly parallel to the X-axis direction.

A first through hole 3a is formed in one end of the second link 3 and the first rotation shaft 2a of the first link 2 is inserted in this first through hole 3a. Further, a second through hole 3b is formed in the other end of the second link 3.

The third link 4 is connected so that it can rotate around the second rotation shaft 2b provided in the first link 2 with respect to the first link 2. For example, the third link 4 is disposed roughly parallel to the second link 3 and slightly off to the Z-axis positive side with respect to the second link 3 as viewed in the Y-axis direction. Further, the third link 4 is disposed so that the third and second links 4 and 3 sandwich the first link 2 therebetween as viewed in the Z-axis direction.

As a basic form, the third link 4 is composed of a roughly rectangular plate member having a small thickness in the Y-axis direction and in which a ratio of a long-side length to a short-side length on the XZ-plane is large. Further, the length of the third link 4 in the X-axis direction, i.e., the length of its long side is roughly equal to the length of the second link 3. Further, a first through hole 4a is formed in one end of the third link 4 and the second rotation shaft 2b of the first link 2 is inserted in this first through hole 4a. Further, the third link 4 includes a rotation shaft 4b that protrudes from the other end of the third link 4 toward the Y-axis positive side.

The fourth link 5 is connected so that it can rotate around a rotation shaft 5d provided in the fourth link 5 with respect to the second link 3, and it can rotate around the rotation shaft 4b provided in the third link 4 with respect to the third ink 4. For example, the fourth link 5 is disposed between the second and third links 3 and 4 as viewed in the Z-axis direction.

As a basic form, the fourth link 5 is composed of a plate member that has a small thickness in the Y-axis direction and is bent as viewed in the Y-axis direction (details of which will be described later). Further, the fourth link 5 includes a first part 5a and a second part 5b. The first part 5a has a length roughly equal to that of the first link 2 and is disposed roughly parallel to the first link 2 as viewed in the Y-axis direction.

Specifically, the first part 5a of the fourth link 5 is bent toward the Z-axis positive side with respect to the second part 5b thereof by about 30° at a bending start part between the first and second parts 5a and 5b. Further, a first through hole 5c is formed in the tip of the first part 5a of the fourth link 5 and the rotation shaft 4b of the third link 4 is inserted in this first through hole 5c. Further, the fourth link 5 includes a rotation shaft 5d that protrudes from the bending start part toward the Y-axis positive side. The rotation shaft 5d is inserted in the second through hole 3b of the second link 3.

In this way, the first, second and third links 2, 3 and 4, and the first part 5a of the fourth link 5 form a four-segment parallel link mechanism 9. Further, as this parallel link mechanism 9 rotates, the second part 5b of the fourth link 5 rotates around the rotation shaft 5d thereof. The second part 5b extends roughly in the X-axis direction and a second through hole 5e is formed in the tip of the second part 5b.

However, although the first, second and third links 2, 3 and 4, and the first part 5a of the fourth link 5 form the four-segment parallel link mechanism 9 in this embodiment, the first, second and third links 2, 3 and 4, and the first part 5a of the fourth link 5 may form any type of four-link mechanism that constitutes closed links.

The fifth link 6 is connected so that it can rotate around a first rotation shaft 6a provided in the fifth link 6 with respect to the third link 4. For example, the fifth link 6 is slightly off to the Z-axis positive side with respect to the fourth link 5 as viewed in the Y-axis direction, and slightly off to the Y-axis negative side with respect to the third link 4 as viewed in the Z-axis direction.

As a basic form, the fifth link 6 is composed of a roughly rectangular plate member having a small thickness in the Y-axis direction and in which a ratio of a long-side length to a short-side length on the XZ-plane is large. Further, the fifth link 6 includes a first rotation shaft 6a that protrudes from one end of the fifth link 6 toward the Y-axis positive side, and the first rotation shaft 6a is inserted in a second through hole 4d formed in a protruding part 4c of the third link 4 protruding toward the Z-axis positive side. Further, the fifth link 6 includes a second rotation shaft 6b that protrudes from the other end of the fifth link 6 toward the Y-axis positive side.

The sixth link 7 is connected so that it can rotate around a rotation shaft 7d provided in the sixth link 7 with respect to the fourth link 5, and it can rotate around the second rotation shaft 6b provided in the fifth link 6 with respect to the fifth link 6. For example, the sixth link 7 is disposed between the fourth and fifth links 5 and 6 as viewed in the Z-axis direction.

As a basic form, the sixth link 7 is composed of a plate member that has a small thickness in the Y-axis direction and is bent as viewed in the Y-axis direction (details of which will be described later). Further, the sixth link 7 includes a first part 7a and a second part 7b. The first part 7a has a length roughly equal to that of the first link 2 and is disposed roughly parallel to the first link 2 as viewed in the Y-axis direction. The second part 7b extends roughly in the X-axis direction.

That is, the first part 7a of the sixth link 7 is bent toward the Z-axis positive side with respect to the second part 7b thereof by about 30° at a bending start part between the first and second parts 7a and 7b. Further, a through hole 7c is formed in the tip of the first part 7a of the sixth link 7 and the second rotation shaft 6b of the fifth link 6 is inserted in the through hole 7c. Further, the sixth link 7 includes a rotation shaft 7d that protrudes from the bending start part toward the Y-axis positive side. The rotation shaft 7d is inserted in the second through hole 5e of the fourth link 5.

In an initial state of the first, second, third, fourth, fifth and sixth links 2, 3, 4, 5, 6 and 7 having the above-described configuration, a center $O_1$ of the first rotation shaft 2a of the first link 2, which is the rotation shaft of the second link 3 with respect to the first link 2, an center $O_2$ of the rotation shaft 5d of the fourth link 5 with respect to the second link 3, and a center $O_3$ of the rotation shaft 7d of the sixth link 7 with respect to the fourth link 5, are arranged in a roughly straight line parallel to the X-axis.

Further, in the initial state of the first, second, third, fourth, fifth and sixth links 2, 3, 4, 5, 6 and 7, a side of the second link 3 on the Z-axis negative side, a side of the second part 5b of the fourth link 5 on the Z-axis negative side, and a side of the second part 7b of the sixth link 7 on the Z-axis negative side are arranged in a roughly straight line parallel to the X-axis.

That is, in the initial state of the first, second, third, fourth, fifth and sixth links 2, 3, 4, 5, 6 and 7, the second link 3, the second part 5b of the fourth link 5, and the second part 7b of the sixth link 7 are arranged in a roughly straight line in the X-axis direction. Note that the second link 3 forms a base segment of the finger 1 and the second part 5b of the fourth link 5 forms a middle segment of the finger 1. Further, the second part 7b of the sixth link 7 forms a distal segment of the finger 1.

The elastic member 8 is, for example, a coil spring. One end of the elastic member 8 is fixed to the second link 3. The other end of the elastic member 8 is fixed to the third link 4. The elastic member 8 having the above-described configuration is disposed in a cut-out part 3c formed, as viewed in the Y-axis direction, on a side of the second link 3 on the Z-axis positive side and a cut-out part 4e formed on a side of the third link 4 on the Z-axis negative side. However, the elastic member 8 is not limited to the coil spring and may be other types of elastic members. For example, a tension spring, a torsion spring, or the like may be used.

Note that regarding the elastic member 8 according to this embodiment, in an initial state of the finger 1, on the XZ-plane, a distance $R_1$ between a second straight line $L_2$ that passes through a center $O_4$ of the second rotation shaft 2b of the first link 2, which is the rotation shaft of the third link 4 with respect to the first link 2, and is perpendicular to a first straight line $L_1$ passing through the center $O_4$ and a center $O_5$ of the rotation shaft 4b of the third link 4, which is the rotation shaft of the fourth link 5 with respect to the third link 4, and a fixed point $J_1$ at which the other end of the elastic member 8 is fixed to the third link 4 is equal to or longer than a distance $R_2$ between a fourth straight line $L_4$ that passes through the center $O_1$ and is perpendicular to a third straight line $L_3$ passing through the centers $O_1$ and $O_2$, and a fixed point $J_2$ at which the one end of the elastic member 8 is fixed to the second link 3 (see FIG. 3), so that as the finger 1 changes from the initial state to a bent state, the elastic member 8 expands and its restoring force increases (details of which will be described later). That is, in the initial state of the finger 1, the elastic member 8 is inclined toward the X-axis positive side with respect to the first link 2.

Next, a fitting motion that is performed when a grasped component (i.e., a component to be grasped) is grasped by a finger 1 to which a joint structure for a robot according to this embodiment is adopted is described. Note that the fitting motion means a motion of the finger 1 that is performed so that the finger 1 conforms to an external shape of the grasped component. Note that in the following description, a counterclockwise rotation direction of a link is defined as a positive direction and a clockwise rotation direction thereof is defined as a negative direction in FIGS. 3 to 6.

Figure 3:
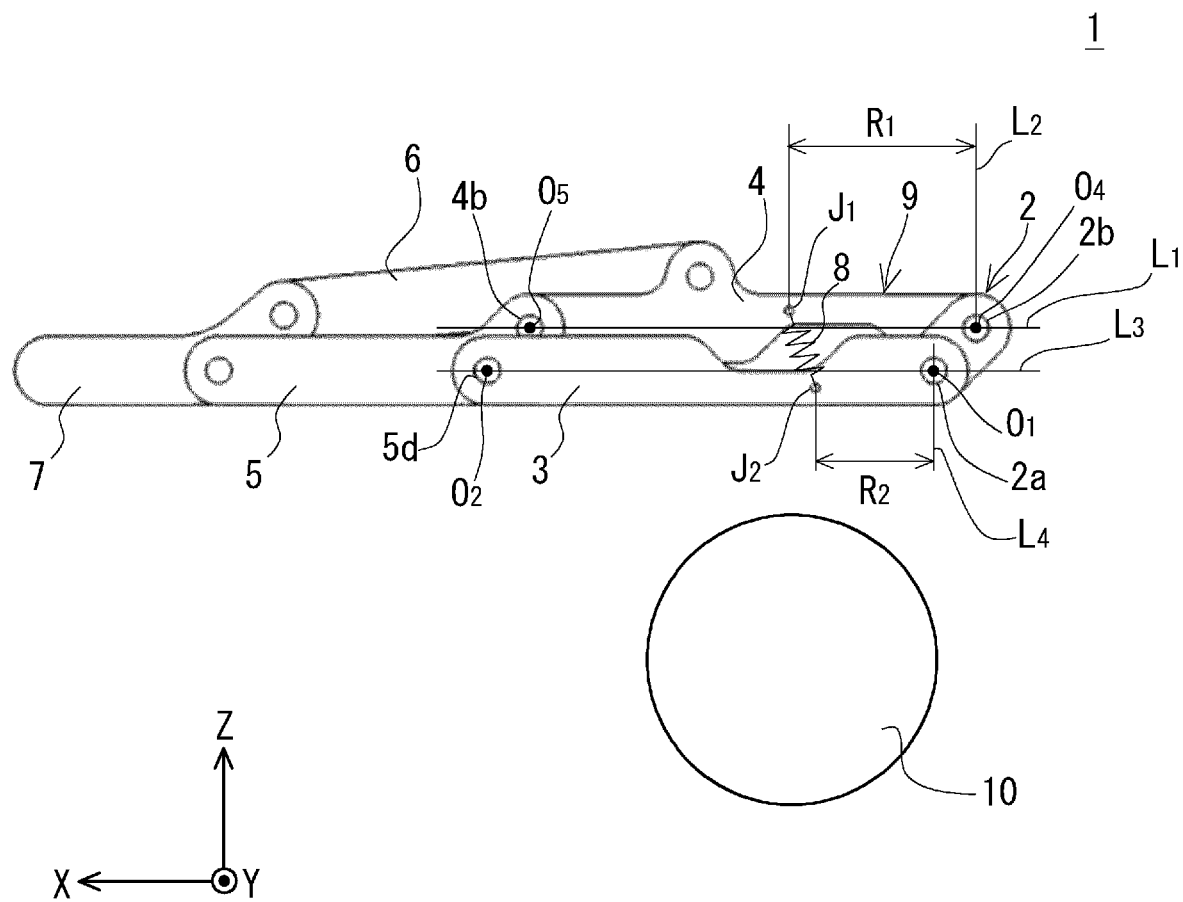
FIG. 3 is a diagram for explaining a fitting motion that is performed when a grasped component is grasped by the finger to which the joint structure for the robot according to the first embodiment is adopted.
Figure 4:
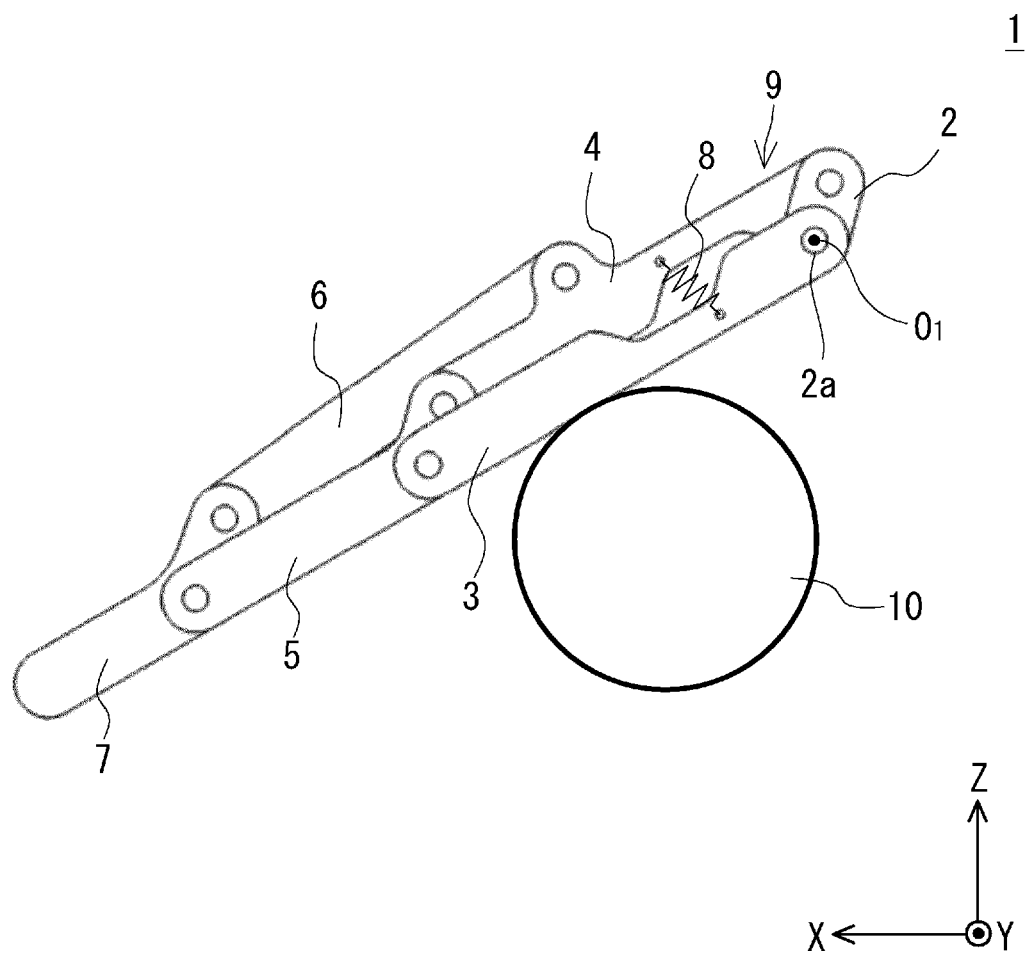
FIG. 4 is a diagram for explaining a fitting motion that is performed when the grasped component is grasped by the finger to which the joint structure for the robot according to the first embodiment is adopted.

FIGS. 3 to 6 are diagrams for explaining a fitting motion that is performed when a grasped component is grasped by a finger to which a joint structure for a robot according to this embodiment is adopted. A state in which the finger 1 is extended in the X-axis positive direction as shown in FIG. 3 is defined as an initial state. Next, an actuator (a servo motor) is driven and hence the first link 2 is rotated around the first rotation shaft 2a of the first link 2 in the positive direction. That is, in the state in which the finger 1 is extended, the finger 1 is rotated around the first rotation shaft 2a so that the finger 1 is moved closer to the grasped component 10. As a result, the second link 3 comes into contact with the grasped component 10 as shown in FIG. 4.

Figure 5:
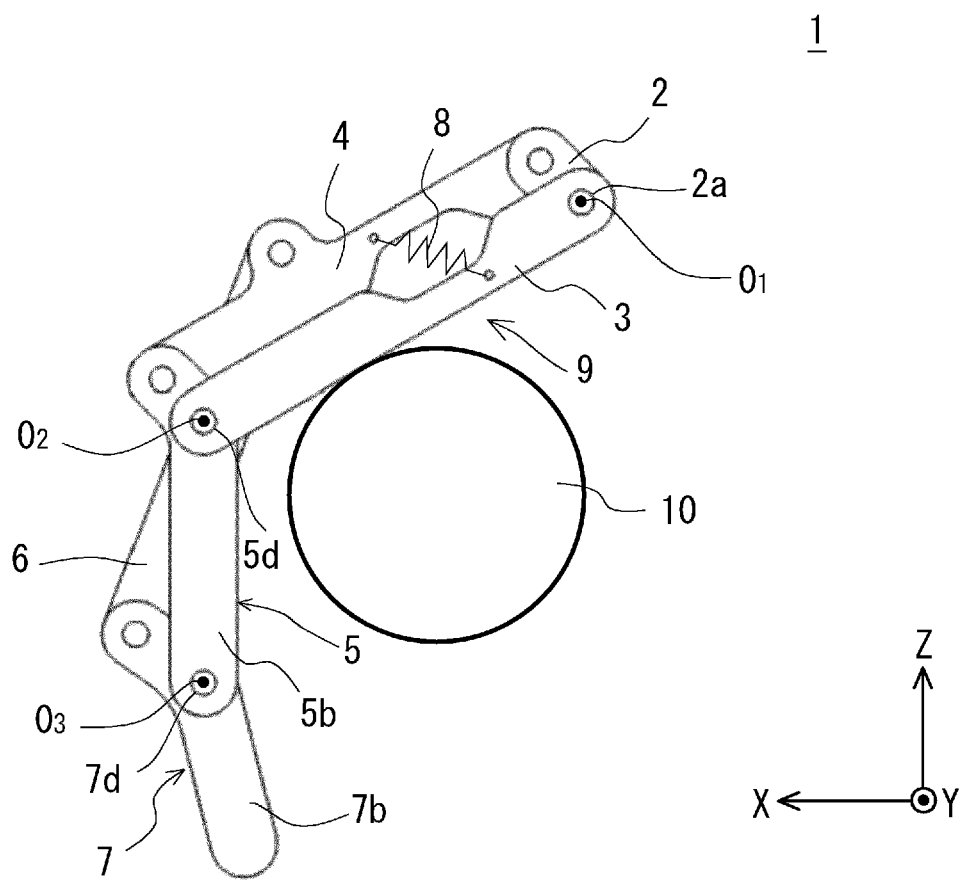
FIG. 5 is a diagram for explaining a fitting motion that is performed when the grasped component is grasped by the finger to which the joint structure for the robot according to the first embodiment is adopted.

From this state, when the actuator is further driven, the parallel link mechanism 9 rotates in the positive direction in a state in which the motion of the second link 3 is restricted by the grasped component 10, i.e., the second link 3 acts as a stationary link as shown in FIG. 5. As a result, the second part 5b of the fourth link 5 rotates around the rotation shaft 5d of the fourth link 5 in the positive direction and moves closer to the grasped component 10. Further, the second part 7b of the sixth link 7 rotates around the rotation shaft 7d of the sixth link 7 in the positive direction and moves closer to the grasped component 10.

Figure 6:
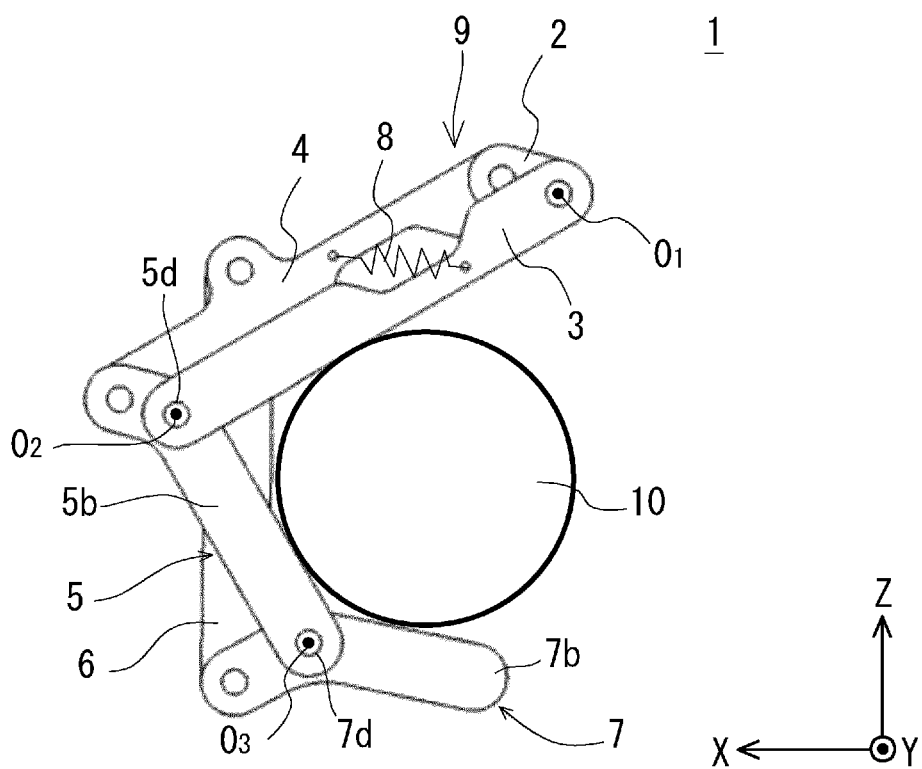
FIG. 6 is a diagram for explaining a fitting motion that is performed when the grasped component is grasped by the finger to which the joint structure for the robot according to the first embodiment is adopted.

Then, when the actuator is further driven, the parallel link mechanism 9 rotates in the positive direction in the state in which the second link 3 acts as the stationary link as shown in FIG. 6. As a result, the second part 5b of the fourth link 5 rotates around the rotation shaft 5d of the fourth link 5 in the positive direction and comes into contact with the grasped component 10. Further, the second part 7b of the sixth link 7 rotates around the rotation shaft 7d of the sixth link 7 in the positive direction and comes into contact with the grasped component 10. In this way, it is possible to make the finger 1 conform to the external shape of the grasped component 10.

In the above-described fitting motion performed by the finger 1, the elastic member 8 expands and its restoring force increases as the finger 1 changes from the initial state to the bent state as described above. That is, the elastic member 8 gives momentum for the fitting motion performed by the finger 1 in a direction in which the finger 1 grasps the grasped component 10.

Figure 7:
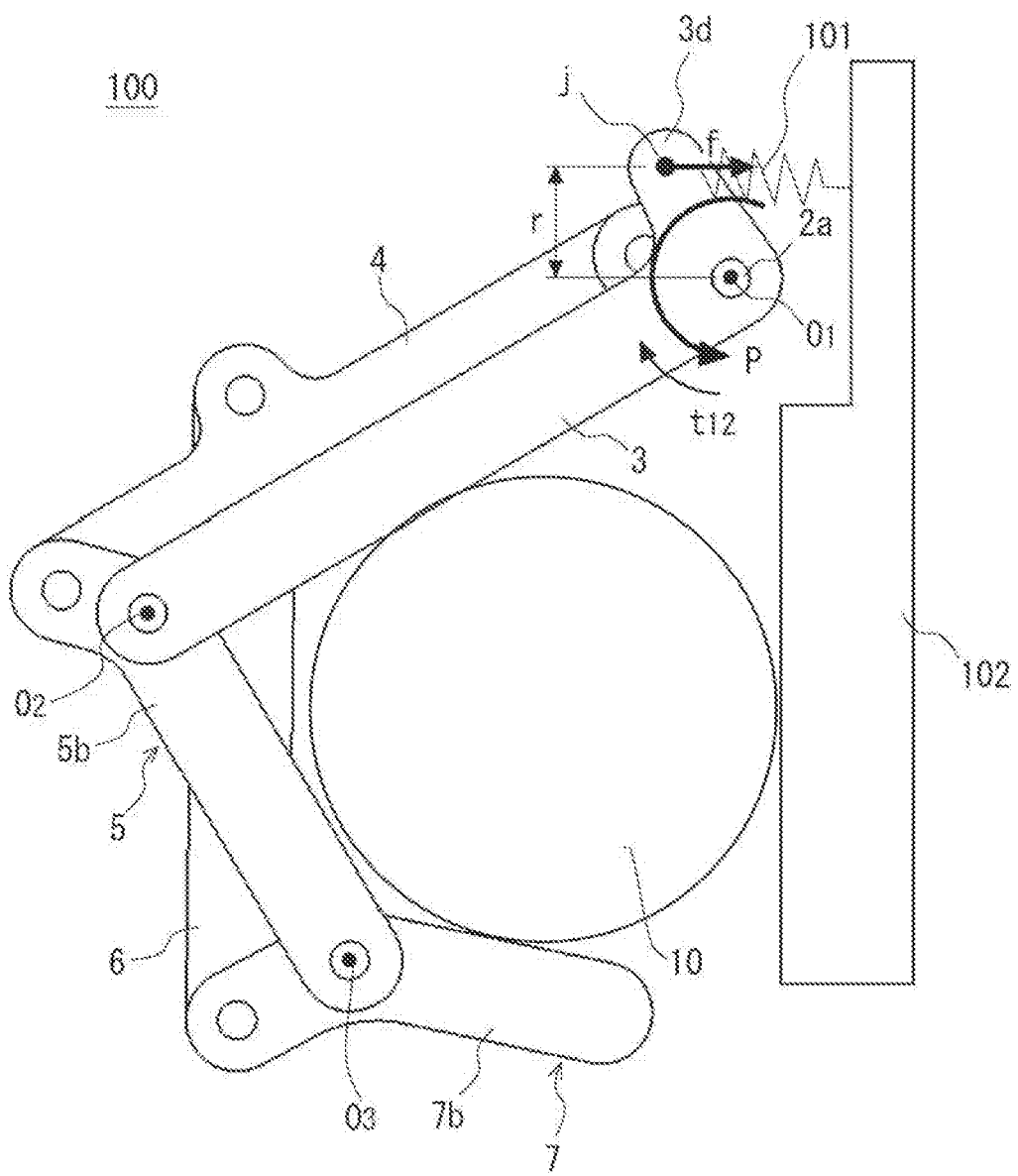
FIG. 7 is a diagram showing a mechanical characteristic of an elastic member when a grasped component is grasped by a finger to which a joint structure for a robot hand disclosed in Patent Literature 1 is adopted.

Next, a working of the restoring force of the elastic member 8 that is performed when the grasped component 10 is grasped by the finger 1 to which the joint structure for a robot according to this embodiment is adopted is described. Firstly, as a comparative example, a working of a restoring force of an elastic member 101 when a grasped component 10 is grasped by a finger 100 to which a finger structure for a robot hand disclosed in Patent Literature 1 is adopted is described. FIG. 7 is a diagram showing a mechanical characteristic of the elastic member when the grasped component is grasped by the finger to which the finger structure for the robot hand disclosed in Patent Literature 1 is adopted.

Note that to facilitate understanding of the difference between the mechanical characteristic of the elastic member 8 of the finger 1 according to this embodiment and that of the elastic member 101 of the finger 100 disclosed in Patent Literature 1, the finger 100 disclosed in Patent Literature 1 has a link structure identical to that of the finger 1 according to this embodiment, except for the position of the elastic member 101. Therefore, in FIG. 7, the same reference numbers as those of this embodiment are assigned to links corresponding to those of the fingers 1 according to this embodiment.

As shown in FIG. 7, in the finger 100 disclosed in Patent Literature 1, the elastic member 101 is disposed between a protruding part 3d formed in one end of the second link 3 and a palm part 102 so that a restoring force is exerted in a direction in which the finger 100 is extended.

A moment $t_{12}$ around the first rotation shaft 2a of the first link 2 when a grasped component 10 is grasped by the finger 100 disclosed in Patent Literature 1 and the palm part 102 is expressed by the below-shown <Expression 1>.

$$t_{12} = -fr \qquad \text{<Expression 1>}$$

In the expression, f is a restoring force of the elastic member 101, and r is a distance between a center $O_1$ and a fixing point j at which the elastic member 101 is fixed to the protruding part 3d of the second link 3 in a direction perpendicular to an expanding/contracting direction of the elastic member 101.

The above-described moment $t_{12}$ acts in a direction opposite to that of the driving force P of the actuator. Therefore, when the driving force P of the actuator is applied to the finger 100, a moment that the finger 100 gives to the grasped component 10 can be expressed by the below-shown <Expression 2>.

$$P+t_{12}=P-fr \qquad \text{<Expression 2>}$$

Figure 8:
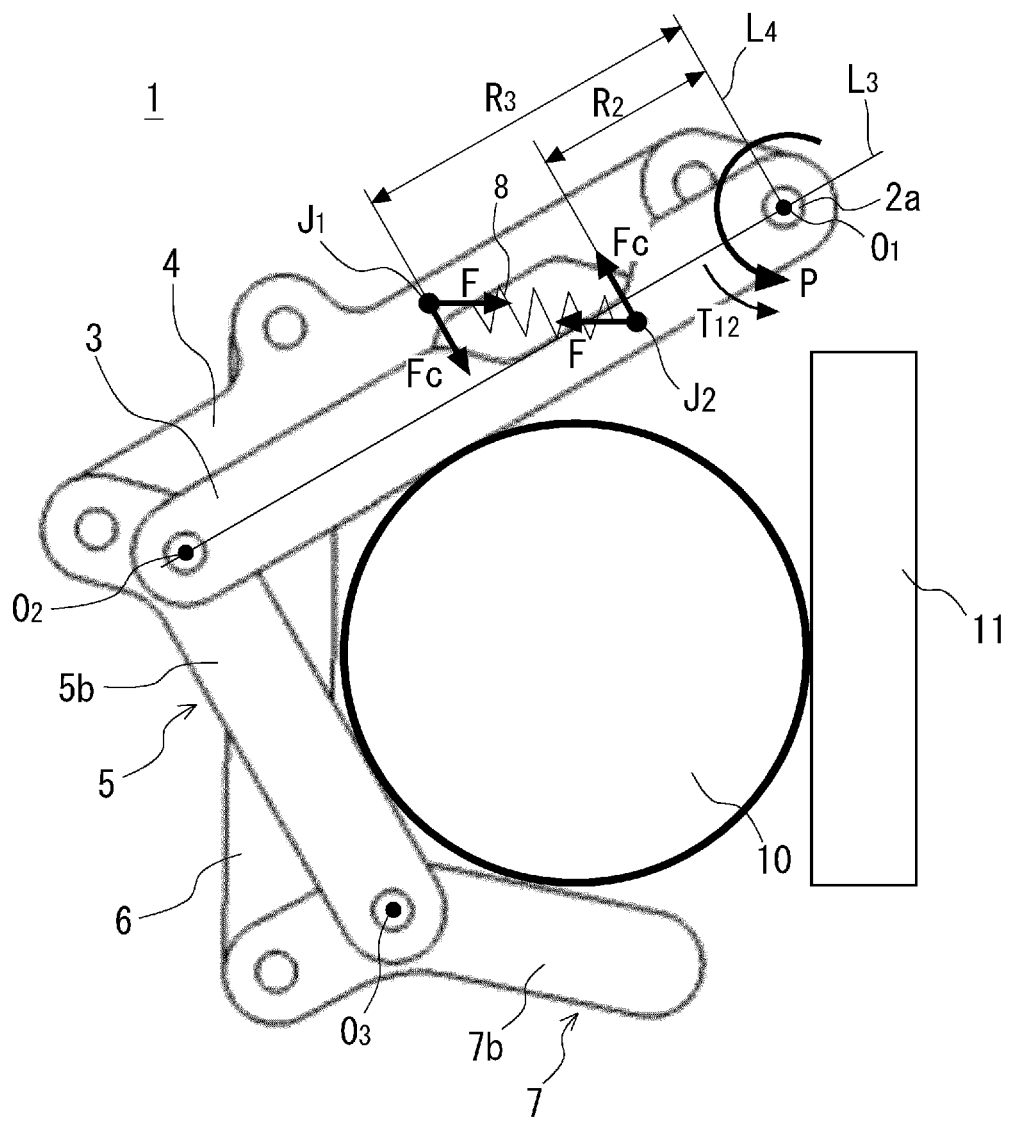
FIG. 8 is a diagram showing a mechanical characteristic of an elastic member when a grasped component is grasped by the finger to which the joint structure for the robot according to the first embodiment is adopted.
Figure 9:
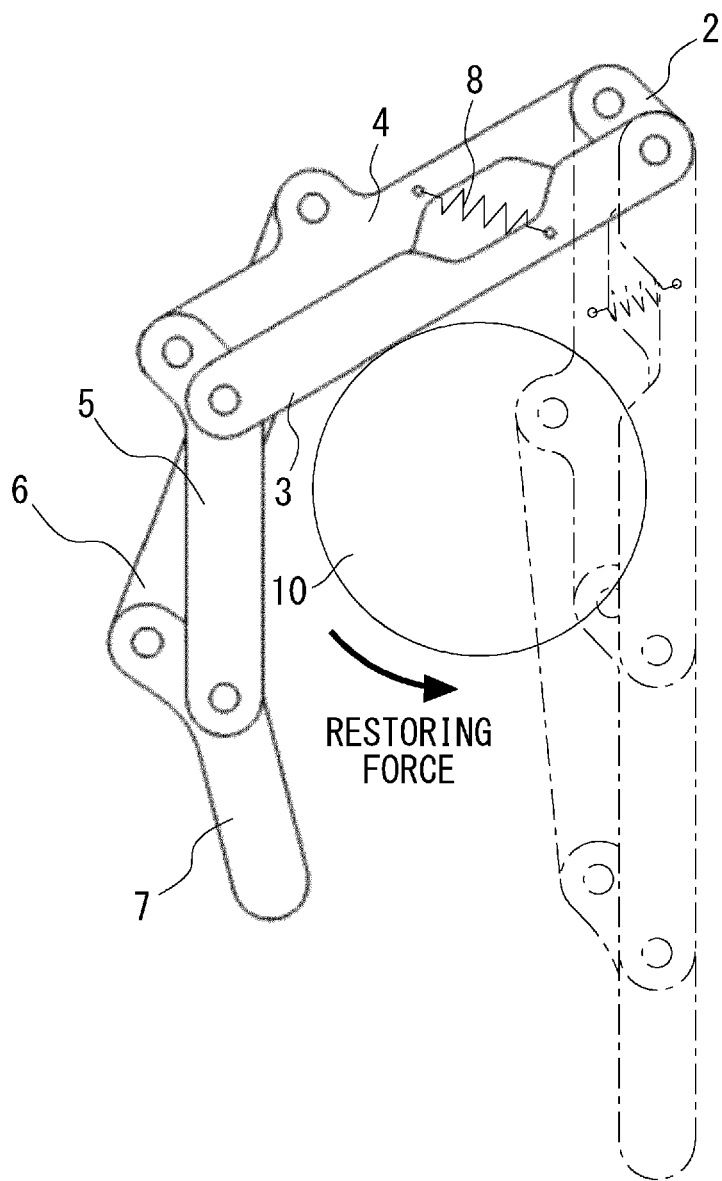
FIG. 9 is a diagram for explaining a working of a restoring force of an elastic member according to the first embodiment.

FIG. 8 is a diagram showing a mechanical characteristic of an elastic member when a grasped component is grasped by a finger to which a joint structure for a robot according to this embodiment is adopted. FIG. 9 is a diagram for explaining a working of a restoring force of the elastic member according to this embodiment. Note that in FIG. 9, the state of the finger 1 shown in FIG. 5 is indicated by solid lines. Further, a state of the finger 1 after the grasped component 10 is removed in the state of the finger 1 shown in FIG. 5 and hence the finger 1 are extended due to the restoring force of the elastic member 8 is indicated by dashed lines.

As shown in FIG. 8, when the grasped component 10 is grasped by the finger 1 according to this embodiment and the palm part 11, a moment $T_{12}$ around the first rotation shaft 2a of the first link 2 can be expressed by the below-shown <Expression 3>.

$$T_{12}=F_c(R_3-R_2) \qquad \text{<Expression 3>}$$

In the expression, $F_c$ is a component of the restoring force F of the elastic member 8 in a direction perpendicular to the third straight line $L_3$. Further, $R_3$ is a distance between the fourth straight line $L_4$ and the fixed point $J_1$.

Further, for the finger 1 according to this embodiment, there is a relation $R_1>R_2$ in the initial state of the finger 1 as described above. Therefore, when the first link 2 is rotated around the first rotation shaft 2a, a relation $R_3>R_2$ holds and hence a moment by which the finger 1 is pressed against the grasped component 10 is generated during the fitting motion performed by the finger 1. That is, as shown in FIG. 9, a restoring force that acts so as to restore the finger 1 to the extended state is applied to the finger 1 by the elastic member 8. Therefore, when the driving force P of the actuator is applied to the finger 1, a moment that the finger 1 gives to the grasped component 10 can be expressed by the below-shown <Expression 4>.

$$P+T_{12}=P+F_c(R_3-R_2) \qquad \text{<Expression 4>}$$

As described above, when the grasped component 10 is grasped by the finger 100 disclosed in Patent Literature 1, a moment is applied in the direction opposite to the direction in which the grasped component 10 is grasped by the elastic member 101. Therefore, when the grasped component 10 is grasped by the finger 100, the restoring force of the elastic member 101 is subtracted from the driving force P of the actuator. Therefore, a driving force P that overcomes the restoring force of the elastic member 101 is required and hence the size of the actuator for moving the finger 100 has to be increased.

In contrast to this, when the grasped component 10 is grasped by the finger 1 according to this embodiment, a moment is applied in the direction to which the grasped component 10 is grasped by the elastic member 8. Therefore, when the grasped component 10 is grasped by the finger 1, the restoring force of the elastic member 8 is added to the driving force P of the actuator. Consequently, compared to the finger 100 disclosed in Patent Literature 1, the grasped component 10 can be grasped with only a small driving force P. As a result, the joint structure for a robot adopted in the finger 1 according to this embodiment can contribute to reducing the size of the actuator. Further, owing to this reduction in size, it is possible to, for example, construct a robot hand for a low cost and reduce the weight thereof.

Further, compared to the finger 100 disclosed in Patent Literature 1, the finger 1 according to this embodiment can, when the same driving force is applied by the actuator, provide a larger grasping force and hence grasp the grasped component 10 more firmly.

Second Embodiment

In the first embodiment, the fitting motion of the finger 1 that is performed when the second link 3 comes into contact with the grasped component 10 is described. It should be noted that a similar fitting motion can be performed when the second part 5b of the fourth link 5 comes into contact with the grasped component 10.

Figure 10:
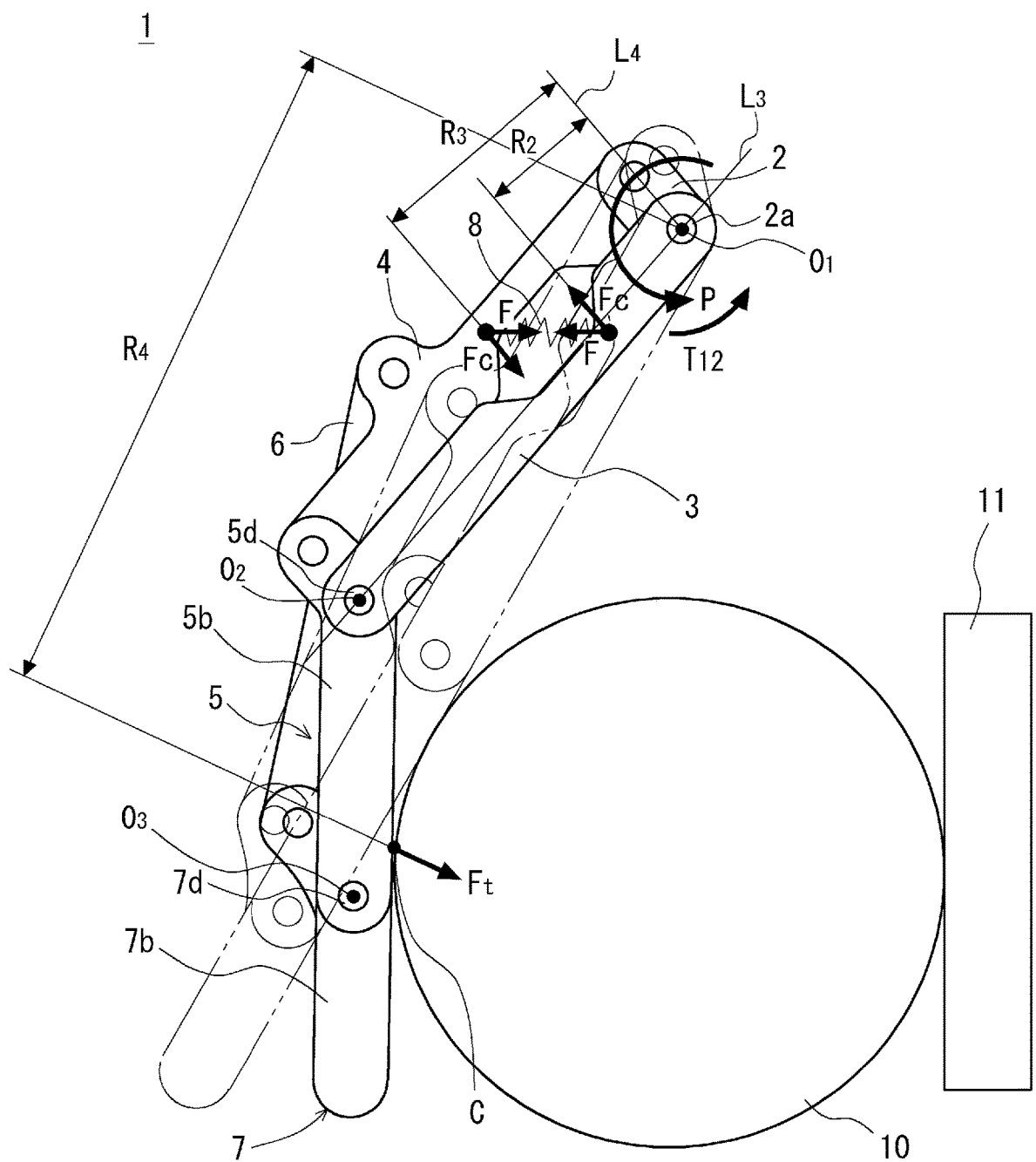
FIG. 10 is a diagram showing a mechanical characteristic of an elastic member when a grasped component is grasped by a finger to which a joint structure for a robot according to a second embodiment is adopted.

FIG. 10 is a diagram showing a mechanical characteristic of an elastic member when a grasped component is grasped by a finger to which a joint structure for a robot according to this embodiment is adopted. Note that in FIG. 10, a state of the finger 1 immediately after the second part 5b of the fourth link 5 comes into contact with the grasped component 10 is indicated by dashed lines. Further, a state of the finger 1 in which the actuator is being driven and a fitting motion is being performed is indicated by solid lines.

As shown in FIG. 10, when the grasped component 10 is grasped by the finger 1 according to this embodiment and the palm part 11, a force $F_t$ that is applied from the finger 1 to the grasped component 10 is expressed by the below-shown <Expression 5>.

$$F_t=R_4(P+T_{12})=R_4(P+F_c(R_3-R_2)) \qquad \text{<Expression 5>}$$

In the expression, $R_4$ is a distance between the center $O_1$ and a contact point C at which the second part 5b of the fourth link 5 comes into contact with the grasped component 10.

In this state, the force $F_t$ is applied in a tangential direction of a circle that is drawn by using a segment between the center $O_1$ and the contact point C as its diameter, and is applied toward the grasped component 10. Therefore, in this embodiment, the restoring force of the elastic member 8 is also added to the driving force P of the actuator. Therefore, compared to the finger 100 disclosed in Patent Literature 1, the grasped component 10 can be grasped with only a small driving force P.

It should be noted that when the actuator is further driven, the fourth link 5 rotates around the rotation shaft 5d from the state of the finger 1 shown in FIG. 10 in the positive direction and thereby pulls up the grasped component 10 toward the second link 3. At the same time, the sixth link 7 rotates around the rotation shaft 7d in the positive direction and thereby conforms to (the external shape of) the grasped component 10. Then, lastly, the second link 3, the second part 5b of the fourth link 5, and the second part 7b of the sixth link 7 come into contact with the grasped component 10, thus making it possible to conform the finger 1 to (the external shape of) the grasped component 10.

Note that in the above-described first and second embodiments, the second link 3, the second part 5b of the fourth link 5, and the second part 7b of the sixth link 7 are arranged in a roughly straight line in the initial state of the finger 1. However, they may be arranged in a slightly curved line in the initial state.

Further, the shape of each of the links 2, 3, 4, 5, 6 and 7, and their arrangements are not limited to any particular shapes and arrangements. Further, the relations between the rotation shafts and the through holes are also not limited to any particular relations. In short, the only requirements are as follows. That is, the second link 3 should be rotatable with respect to the first link 2; the third link 4 should be rotatable with respect to the first link 2; the fourth link 5 should be rotatable with respect to the second and third links 3 and 4; the fifth link 6 should be rotatable with respect to the third link 4; and the sixth link 7 should be rotatable with respect to the fourth and fifth links 5 and 6. Further, the relation "(Distance $R_1$)>(Distance $R_2$)" should be satisfied in the initial state of the finger 1.

Note that the fifth and sixth links 6 and 7 may be omitted. However, by providing the fifth and sixth links 6 and 7, it is possible to achieve a fine fitting motion for the grasped component 10.

Third Embodiment

Figure 11:
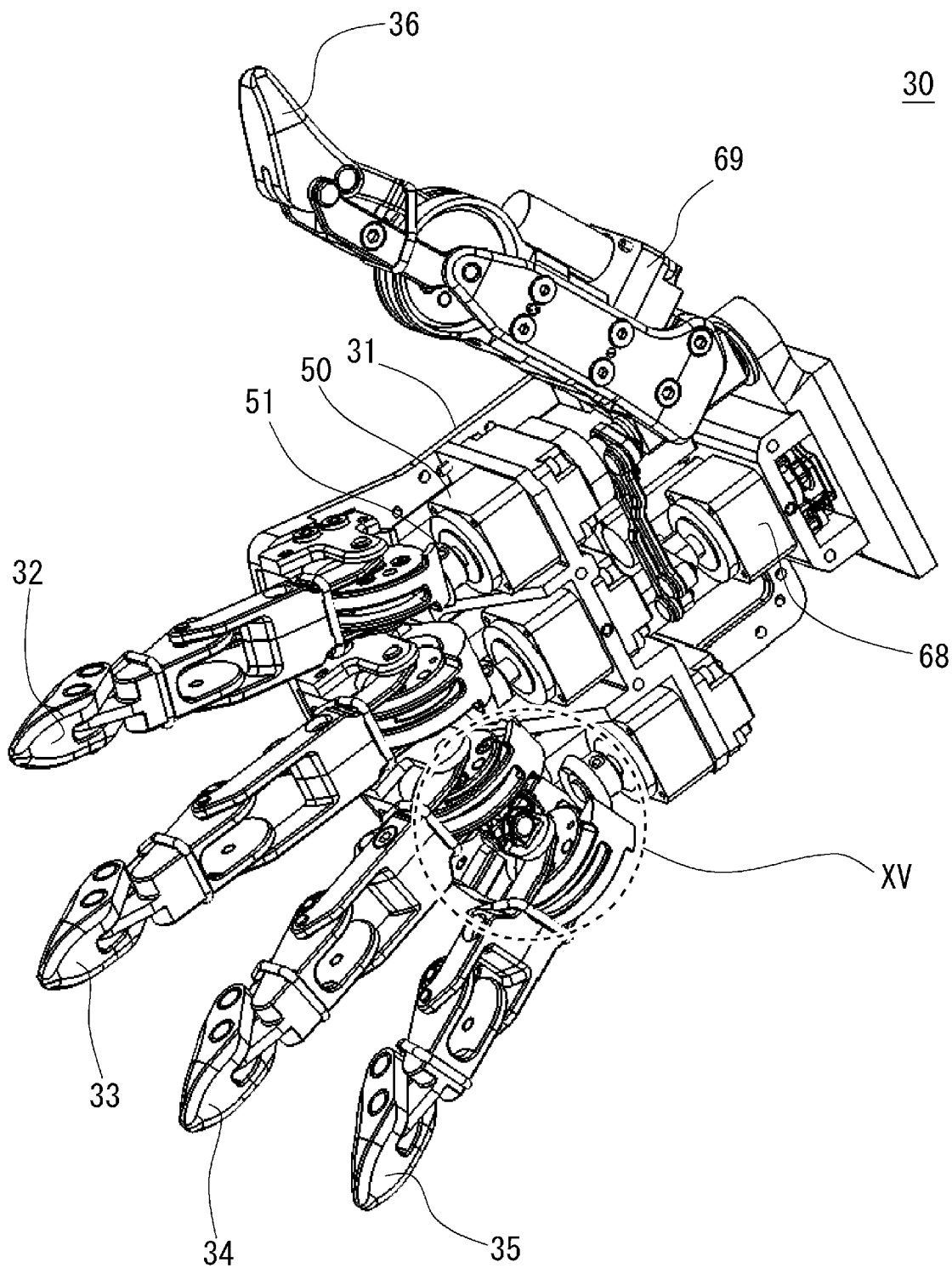
FIG. 11 is a drawing schematically showing a configuration of a robot hand according to a third embodiment.
Figure 12:
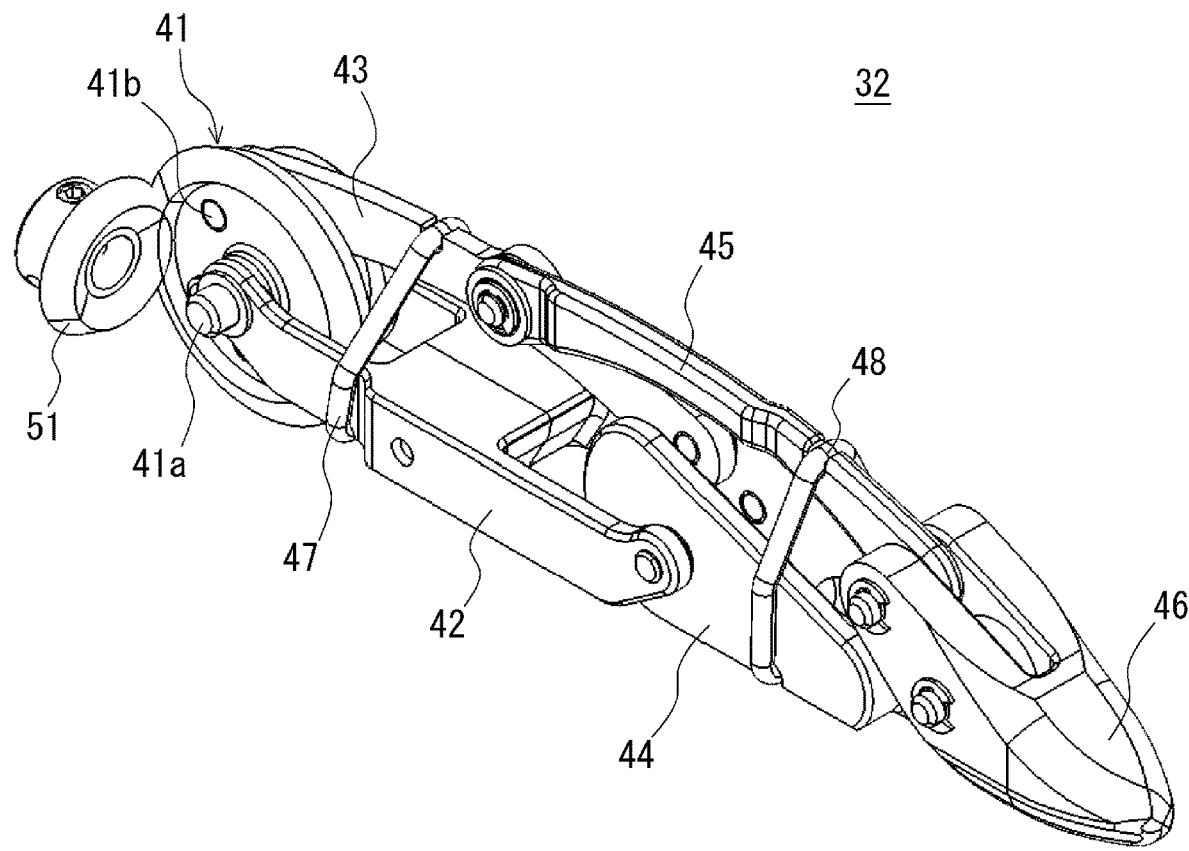
FIG. 12 is a drawing schematically showing an index finger of the robot hand according to the third embodiment.
Figure 13:
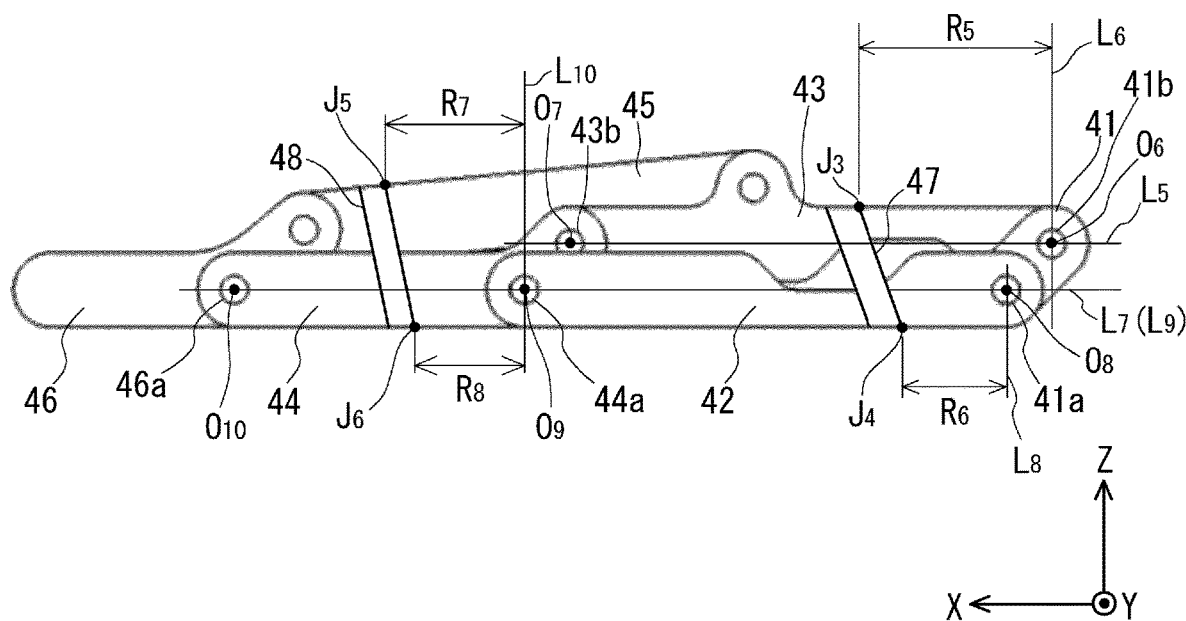
FIG. 13 is a diagram for explaining a disposition of an elastic member in the index finger of the robot hand according to the third embodiment.
Figure 14:
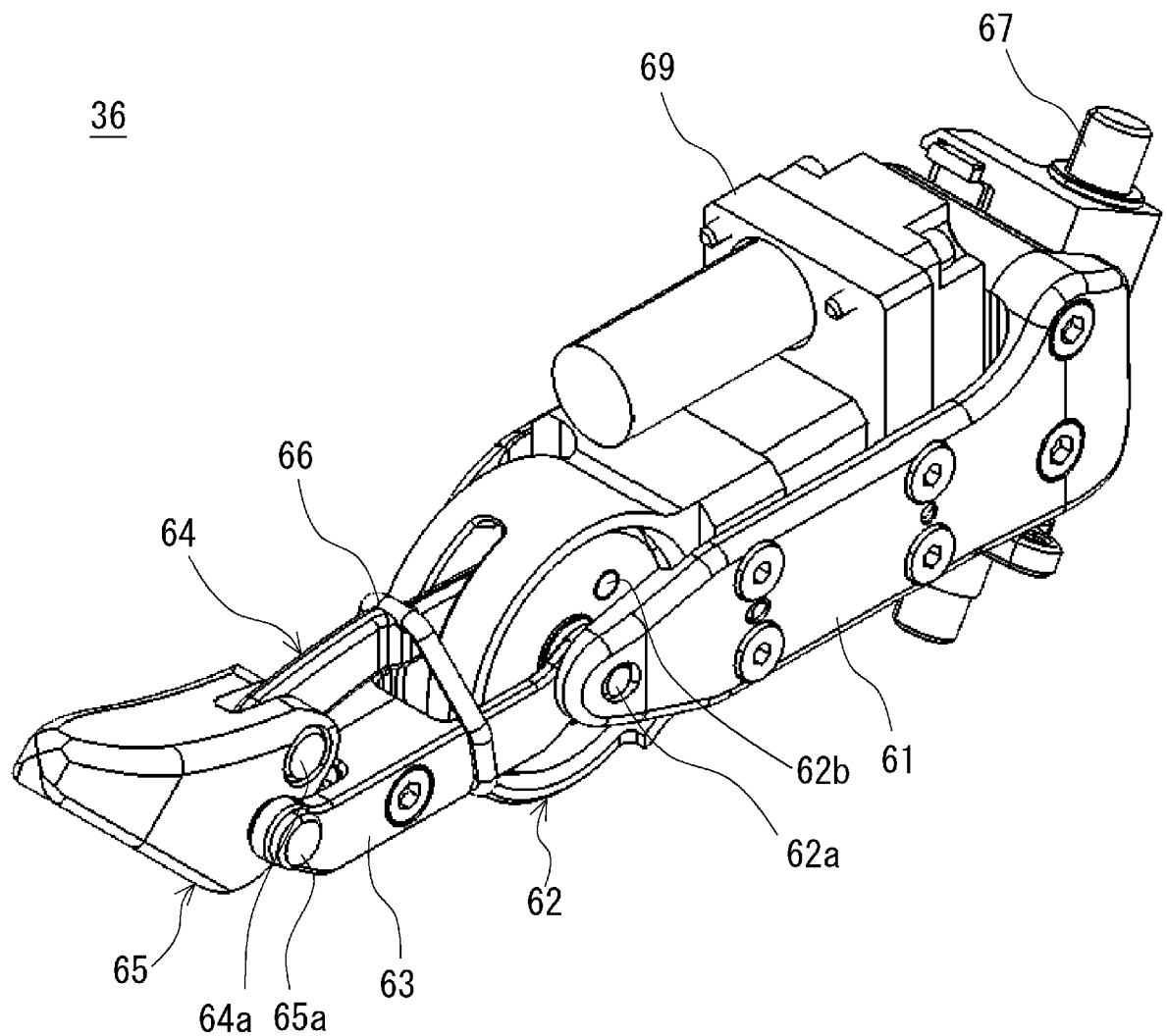
FIG. 14 is a diagram schematically showing a thumb of the robot hand according to the third embodiment.
Figure 15:
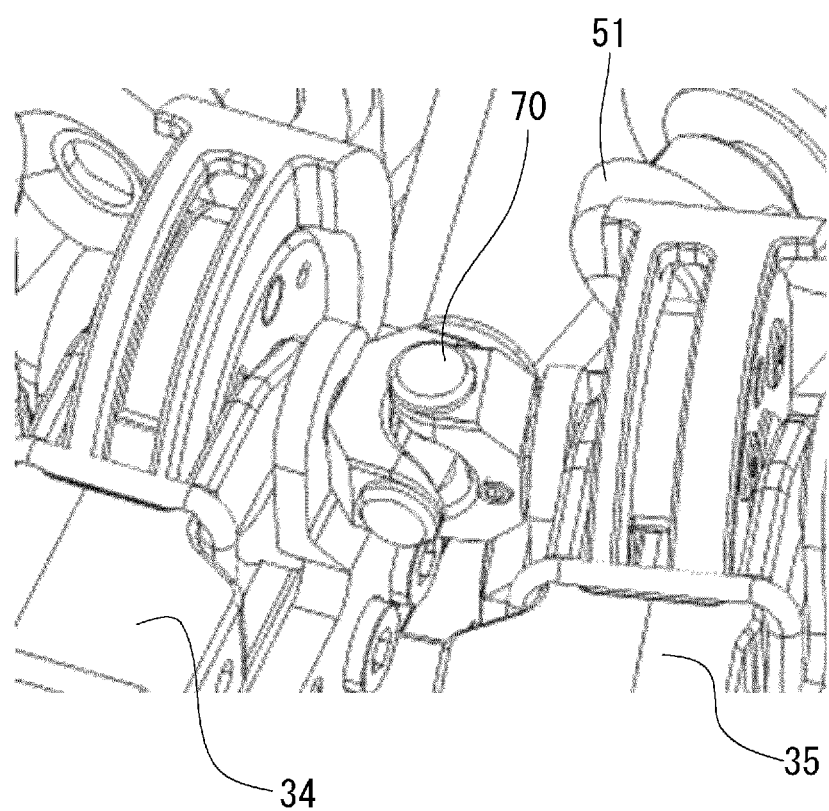
FIG. 15 is an enlarged view of a part XV shown in FIG. 11.

FIG. 11 is a drawing schematically showing a configuration of a robot hand according to this embodiment. FIG. 12 is a drawing schematically showing an index finger of the robot hand according to this embodiment. FIG. 13 is a diagram for explaining a disposition of an elastic member in the index finger of the robot hand according to this embodiment. FIG. 14 is a diagram schematically showing a thumb of the robot hand according to this embodiment. FIG. 15 is an enlarged view of a part XV shown in FIG. 11.

As shown in FIG. 11, a robot hand 30 according to this embodiment includes a palm part 31, an index finger 32, a middle finger 33, a ring finger 34, a little finger 35, and a thumb 36. Further, a finger structure for a robot hand according to the first embodiment is adopted in each of the fingers 32, 33, 34, 35 and 36. Note that although the palm part 31 shown in FIG. 11 constitutes the back of the hand, it may constitute the palm of the hand.

Note that the index finger 32, the middle finger 33, the ring finger 34, and the little finger 35 have roughly the same configurations as each other, except for the lengths of the links. Therefore, only the index finger 32 is described as a representative example. As shown in FIG. 12, the index finger 32 according to this embodiment includes a first link 41, a second link 42, a third link 43, a fourth link 44, a fifth link 45, a sixth link 46, a first elastic member 47, and a second elastic member 48. Further, their connective relation is roughly identical to that of the finger 1 according to the first embodiment.

That is, the first link 41 corresponds to the first link 2 of the finger 1 according to the first embodiment, and the second link 42 corresponds to the second link 3 of finger 1 according to the first embodiment. The third link 43 corresponds to the third link 4 of the finger 1 according to the first embodiment, and the fourth link 44 corresponds to the fourth link 5 of the finger 1 according to the first embodiment. The fifth link 45 corresponds to the fifth link 6 of the finger 1 according to the first embodiment, and the sixth link 46 corresponds to the sixth link 7 of the finger 1 according to the first embodiment.

However, the first link 41 according to this embodiment constitutes a bevel gear with a pinion gear 51 of the actuator 50. That is, the first link 41 is a disc-shaped gear wheel with teeth formed along the circumferential edge of the side surface. Further, one end of the second link 42 is rotatably connected to a first rotation shaft 41a fixed to roughly the center of the first link 41. Further, one end of the third link 43 is rotatably connected to the side surface of the first link 41 through a second rotation shaft 41b provided in the first link 41.

Note that in this embodiment, although the first link 41 is rotated by rotational driving performed by the actuator 50, the first link 41 may be rotated by linear driving performed by a linear actuator. Further, the driving force of the actuator 50 may be transmitted to the first link 41 by using a wire, a timing belt, or the like.

The first elastic member 47 is, for example, a ring member made of resin such as rubber, and is stretched over the second and third links 42 and 43. As described above, the first elastic member 47 is formed by a ring member made of resin. Therefore, compared to the case where, for example, a coil spring or the like is used as the first elastic member 47, the space for mounting the first elastic member 47 may be narrowed and the cost is reduced. Note that cut-out parts are preferably formed in the second and third links 42 and 43 so that the first elastic member 47 is hooked on and fixed to the cut-out parts.

Note that the index finger 32 has roughly the same configuration as that of the finger 1 according to the first embodiment. Therefore, the disposition of the first elastic member 47 is described hereinafter by using the configuration of the finger 1 according to the first embodiment. As shown in FIG. 13, in an initial state of the index finger 32, on the XZ-plane, a distance R5 between a second straight line L6 that passes through a center O6 of the second rotation shaft 41b of the first link 41, which is the rotation shaft of the third link 43 with respect to the first link 41, and is perpendicular to a first straight line L5 passing through the center O6 and a center O7 of the rotation shaft 43b of the third link 43, which is the rotation shaft of the fourth link 44 with respect to the third link 43, and a fixed point J3 at which the first elastic member 47 is fixed to the third link 43 is equal to or longer than a distance R6 between a fourth straight line L8 that passes through a center O8 of the first rotation shaft 41a of the first link 41, which is the rotation shaft of the second link 42 with respect to the first link 41, and is perpendicular to a third straight line L7 passing through the center O8 and a center O9 of the rotation shaft 44a of the fourth link 44 with respect to the second link 42, and a fixed point J4 at which the first elastic member 47 is fixed to the second link 42. That is, in the initial state of the index finger 32, the first elastic member 47 is inclined toward the X-axis positive side with respect to the first link 41. In this way, similarly to the first embodiment, when the index finger 32 is bent, the restoring force of the first elastic member 47 can be added to the driving force P of the actuator.

The second elastic member 48 is, for example, a ring member made of resin such as rubber, and is stretched over the fourth and fifth links 44 and 45. Note that as shown in FIG. 13, in the initial state of the index finger 32, on the XY-plane, a distance $R_7$ between a sixth straight line $L_{10}$ that passes through a center $O_9$ and is perpendicular to a fifth straight line $L_9$ passing through the center $O_9$ and a center $O_{10}$ of the rotation shaft 46a of the sixth link 46 with respect to the fourth link 44, and a fixed point $J_5$ at which the second elastic member 48 is fixed to the fifth link 45 is equal to or longer than a distance $R_8$ between the sixth straight line $L_{10}$ and a fixed point $J_6$ at which the second elastic member 48 is fixed to the fourth link 44. That is, roughly speaking, the fixed point $J_5$ is disposed in the fingertip side of the index finger 32 with respect to the fixed point $J_6$ in the initial state of the index finger 32.

In this way, similarly to the first elastic member 47, the second elastic member 48 expands and its restoring force increases as the index finger 32 changes from the initial state to the bent state in the fitting motion performed by the index finger 32. Therefore, when the fourth and sixth links 44 and 46 are rotated, the restoring force of the second elastic member 48 can be added to the driving force P of the actuator.

In addition, the second elastic member 48 is also formed by a ring member made of resin. Therefore, compared to the case where, for example, a coil spring or the like is used as the second elastic member 48, the space for mounting the second elastic member 48 may be narrowed and the cost is reduced. Note that cut-out parts are preferably formed in the fourth and fifth links 44 and 45 so that the second elastic member 48 is hooked on and fixed to the cut-out parts.

Note that the first and second elastic members 47 and 48 are not limited to ring members made of resin. That is, they may be coil springs as in the case of the first embodiment. Further, the first and second elastic members 47 and 48 are not limited to those made of rubber, and may be any kind of members that produce restoring forces. Note that the second elastic member 48 can be omitted.

As shown in FIG. 14, the thumb 36 includes a base part 61, a first link 62, a second link 63, a third link 64, a fourth link 65, and an elastic member 66. The base part 61 is rotatably connected to the palm part 31 through a rotation shaft 67 for enabling the thumb 36 to rotate inward and outward. The rotation shaft 67 is connected to a first actuator 68 so that a rotational torque can be transmitted from the first actuator 68 to the rotation shaft 67. When the first actuator 68 is driven, the thumb 36 rotates inward or outward around the rotation shaft 67. In this way, the thumb 36 can be opposed to the index finger 32 or the like.

The first link 62 is formed in a disc shape. Further, the first link 62 rotates around a first rotation shaft 62a that is fixed roughly to the center of the first link 62 based on a rotation torque of a second actuator 69. The second link 63 corresponds to the second link 3 of the finger 1 according to the first embodiment and forms a base segment of the thumb 36. Further, one end of the second link 63 is rotatably connected to the first rotation shaft 62a of the first link 62.

The third link 64 corresponds to the third link 4 of the finger 1 according to the first embodiment. One end of the third link 64 is rotatably connected to a side surface of the first link 62 through a second rotation shaft 62b provided in the first link 62. The fourth link 65 corresponds to the sixth link 7 of the finger 1 according to the first embodiment and forms an end segment of the thumb 36. Further, the fourth link 65 is rotatably connected to the other end of the second link 63 through a rotation shaft 65a provided on the fourth link 65, and also rotatably connected to the other end of the third link 64 through a rotation shaft 64a provided in the third link 64.

In the robot hand 30 having the above-described configuration, each of the fingers 32, 33, 34, 35 and 36 is constructed by adopting a disposition of an elastic member similar to that of the first embodiment. Therefore, similarly to the first embodiment, it is possible to contribute to reducing the sizes of the actuator 50 and the second actuator 69. Further, owing to this reduction in size, it is possible to reduce the size of the robot hand 30 and reduce the weight thereof.

Note that the ring finger 34 and the little finger 35 according to this embodiment are preferably moved based on a driving force of one actuator 50. Specifically, as shown in FIG. 15, the first rotation shaft 41a of the first link 41 of the ring finger 34 is connected to the first rotation shaft 41a of the first link 41 of the little finger 35 through a universal joint 70.

In this way, the ring finger 34 and the little finger 35 can be moved based on the driving force of the one actuator 50, thus making it possible to reduce the size of the robot hand 30 and reduce the weight thereof even further. Note that the ring finger 34 and the little finger 35 can be made to individually perform a fitting motion for a grasped component by the link structure.

Note that the index finger 32, the middle finger 33, the ring finger 34, and the little finger 35 may also be configured so as to be able to rotate inward and outward as in the case of the thumb 36.

Further, although the robot hand 30 according to this embodiment includes the index finger 32, the middle finger 33, the ring finger 34, the little finger 35, and thumb 36, the number of fingers is not limited to any particular number.

Although the joint structure for a robot according to the above-described embodiment is adopted to fingers of a robot hand, the application is not limited to the fingers. That is, the joint structure can be adopted to other joint parts of robots.

From the disclosure thus described, it will be obvious that the embodiments of the disclosure may be varied in many ways. Such variations are not to be regarded as a departure from the spirit and scope of the disclosure, and all such modifications as would be obvious to one skilled in the art are intended for inclusion within the scope of the following claims.

What is claimed is:

1. A joint structure for a robot, comprising a four-link mechanism, wherein the four-link mechanism comprises:
    a first link configured to be rotatable around a first rotation shaft by an actuator;
    a second link configured to be rotatable around the first rotation shaft with respect to the first link;
    a third link configured to be rotatable around a second rotation shaft with respect to the first link;
    a fourth link configured to be rotatable around a third rotation shaft with respect to the second link, and rotatable around a fourth rotation shaft with respect to the third link,
    the first, second, third and fourth rotation shafts differ from each other,
    the joint structure further comprises a first elastic member, one end of the first elastic member being fixed to the second link and the other end thereof being fixed to the third link,
    when an extended state of a finger is defined as an initial state, the first elastic member expands and its restoring force increases as the finger is bent, and
    in the initial state of the finger, on a plane perpendicular to a direction in which the first rotation shaft extends, a distance between a second straight line passing through a center of the second rotation shaft and a fixed point at which the other end of the first elastic member is fixed to the third link is equal to or longer than a distance between a fourth straight line passing through a center of the first rotation shaft and a fixed point at which the one end of the first elastic member is fixed to the second link, the second straight line being perpendicular to a first straight line passing through centers of the second and fourth rotation shafts, and the fourth straight line being perpendicular to a third straight line passing through centers of the first and third rotation shafts;

a fifth link configured to be rotatable around a fifth rotation shaft with respect to the third link;

a sixth link configured to be rotatable around a sixth rotational shaft with respect to the fourth link, and rotatable around a seventh rotational shaft with respect to the fifth link; and a second elastic member, one end of the second elastic member being fixed to the fourth link and the other end thereof being fixed to the fifth link, wherein the second elastic member expands and its restoring force increases as the finger is bent, and in the initial state of the finger, on a plane perpendicular to a direction in which the third rotation shaft extends, a distance between a sixth straight line passing through a center of the third rotation shaft and a fixed point at which the other end of the second elastic member is fixed to the fifth link is equal to or longer than a distance between the sixth straight line and a fixed point at which the one end of the second elastic member is fixed to the fourth link, the sixth straight line being perpendicular to a fifth straight line passing through centers of the third and sixth rotation shafts.

2. The joint structure for a robot according to claim 1, wherein the second elastic member is a ring member made of resin.

* * * * *